United States Patent
Bang et al.

(10) Patent No.: US 7,750,919 B2
(45) Date of Patent: Jul. 6, 2010

(54) APPARATUS AND METHOD FOR ENHANCING DEVICE-ADAPTIVE COLOR

(75) Inventors: You-sun Bang, Yongin-si (KR); Yun-tae Kim, Yongin-si (KR); Heui-keun Choh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 11/709,849

(22) Filed: Feb. 23, 2007

(65) Prior Publication Data

US 2007/0201063 A1    Aug. 30, 2007

(30) Foreign Application Priority Data

Feb. 24, 2006    (KR)    .................... 10-2006-0018298

(51) Int. Cl.
| | |
|---|---|
| H04N 1/60 | (2006.01) |
| G06K 9/00 | (2006.01) |
| G06F 15/00 | (2006.01) |
| G06F 3/08 | (2006.01) |
| G06F 3/12 | (2006.01) |
| G06T 1/00 | (2006.01) |

(52) U.S. Cl. ................. 345/589; 345/590; 345/591; 345/600; 348/807; 348/708; 358/1.9; 358/518; 358/519; 382/162; 382/167; 382/166; 382/254

(58) Field of Classification Search ......... 345/589–591, 345/597, 600, 604, 606, 618; 348/807–808, 348/630, 708; 358/518–519, 1.9, 520; 382/162, 382/166, 167, 232, 254, 274, 276
See application file for complete search history.

(56) References Cited

U.S. PATENT DOCUMENTS

| | | | | |
|---|---|---|---|---|
| 5,963,201 | A * | 10/1999 | McGreggor et al. ......... | 715/722 |
| 6,044,173 | A * | 3/2000 | Kumada .................... | 382/167 |
| 6,075,888 | A * | 6/2000 | Schwartz ................... | 382/167 |
| 6,128,022 | A * | 10/2000 | Dillinger ................... | 345/591 |
| 6,421,142 | B1 * | 7/2002 | Lin et al. .................... | 358/1.9 |
| 6,646,762 | B1 * | 11/2003 | Balasubramanian et al. . | 358/1.9 |
| 6,778,185 | B1 * | 8/2004 | Moroney .................... | 345/590 |
| 7,116,441 | B1 * | 10/2006 | Matsuoka ................... | 358/1.9 |
| 2003/0112454 | A1 | 6/2003 | Woolfe et al. | |
| 2003/0117457 | A1 | 6/2003 | Qiao | |
| 2006/0072133 | A1 * | 4/2006 | Han et al. ................... | 358/1.9 |
| 2006/0119870 | A1 * | 6/2006 | Ho et al. ..................... | 358/1.9 |
| 2007/0013927 | A1 * | 1/2007 | Miyahara et al. ............ | 358/1.9 |
| 2007/0035751 | A1 * | 2/2007 | Presley et al. ............... | 358/1.9 |
| 2007/0058181 | A1 * | 3/2007 | Hatori ........................ | 358/1.9 |

(Continued)

FOREIGN PATENT DOCUMENTS

WO    WO 01/60051 A1    8/2001

*Primary Examiner*—Wesner Sajous
(74) *Attorney, Agent, or Firm*—Sughrue Mion, PLLC

(57) ABSTRACT

An apparatus and method for enhancing device-adaptive color is disclosed. The apparatus includes an auxiliary-gamut-setting unit which sets a boundary of a device-adaptive auxiliary gamut using information on a color gamut of a source device and information on a color gamut of a desired reference color space; a gamut-conversion unit which converts the color in the gamut of the source device into the color of the set auxiliary gamut; and a gamut-mapping unit which carries out gamut mapping of the color of the auxiliary gamut to a destination gamut of an image output device.

18 Claims, 6 Drawing Sheets

U.S. PATENT DOCUMENTS

2007/0081177 A1* 4/2007 Um et al. ..................... 358/1.9
2007/0091337 A1* 4/2007 Morovic ..................... 358/1.9
2007/0195382 A1* 8/2007 Cho et al. ................... 358/518

* cited by examiner

FIG. 3

- If $W_{source} < W_{sRGB}$, then $W_{Auxiliary} = W_{sRGB}$

Else $W_{Auxiliary} = W_{source}$

- If $K_{source} < K_{sRGB}$, then $K_{Auxiliary} = K_{source}$

Else $K_{Auxiliary} = K_{sRGB}$

- If $C_{source} < C_{sRGB}$, then $C_{Auxiliary} = C_{sRGB}$

Else $C_{Auxiliary} = C_{source}$

- If $L_{source} < L_{sRGB}$, then $L_{Auxiliary} = L_{sRGB}$

Else $L_{Auxiliary} = L_{source}$

APPARATUS AND METHOD FOR ENHANCING DEVICE-ADAPTIVE COLOR

CROSS-REFERENCE TO RELATED APPLICATION

This application claims priority from Korean Patent Application No. 10-2006-0018298 filed on Feb. 24, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to enhancing color, and more particularly to enhancing device-adaptive color, which can set a boundary of a device-adaptive auxiliary color gamut which reflects the characteristics of the color gamut of a source device, and perform mapping of the boundary of the auxiliary color gamut to a destination gamut, so as to enhance color.

2. Description of the Prior Art

Digital image apparatuses, such as monitors, scanners, printers, which reproduce color, have various functions and are of high quality, and use different color spaces or color models according to respective field of application. The color models may be classified into device-dependent models and device-independent models. The former includes the red, green, and blue (RGB) model, which is an additive color space model, and the cyan, magenta, yellow and key (black) (CMYK) color model, which is a subtractive color space model. The latter includes the Commission Internationale d'Eclairage (CIE) L*a*b model wherein the three parameters in the model represent the lightness of the color (L*, L*=0 yields black and L*=100 indicates white), its position between magenta and green (a*, negative values indicate green while positive values indicate magenta) and its position between yellow and blue (b*, negative values indicate blue and positive values indicate yellow). Other models include the CIE XYZ model, and CIE LUV model, wherein L represents the lightness of the color and U and V refer to reference points or the light source. The CIE color model was created by the International Commission on Illumination (ICI) to define a standard relating to illumination systems. In the CIE XYZ color model, RGB tristimulus values are shown as a set of XYZ having other tristimulus values with a positive symbol.

Generally, color enhancement technology is required in order to exactly reproduce the color of images created by a source device in an output apparatus. The color enhancement technologies are used to enhance brightness, saturation, and hue of the images. Related art color enhancement technologies can be generally classified into two types: the first type is used to correct the global color of entire images, and the second type is used to analyze information about the color of input images and partially convert the color of the images by using an image-adaptive method.

However, related art color enhancement technologies have a disadvantage of identically converting color of the input images created by all other source devices without consideration of the characteristics of the source devices, such as, for example, property and color gamut information.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for enhancing device-adaptive color, which can create device-adaptive auxiliary gamut reflecting information about the color gamut of a source device, and carry out mapping of the color gamut, so as to reproduce the color of input images.

According to an aspect of the present invention, there is provided an apparatus for enhancing a device-adaptive color, which includes an auxiliary-gamut-setting unit setting a boundary of a device-adaptive auxiliary gamut using information on a color gamut of a source device creating original images and information on a color gamut of a desired reference color space; a gamut-conversion unit converting color in the gamut of the source device into color of the set auxiliary gamut; and a gamut-mapping unit carrying out a gamut mapping of the color of the auxiliary gamut to a destination gamut of an image output device.

The reference color space may include a standard RGB (sRGB) color space, and the information on the color gamut includes white as a maximum brightness value, black as a minimum brightness value, and a cusp point in the color gamut.

The auxiliary-gamut-setting unit may include a maximum brightness setting unit for setting the larger of the maximum brightness value in the color gamut of the source device and the color gamut of the reference color space, as a maximum brightness value in the auxiliary gamut; a minimum brightness setting unit setting the smaller of the minimum brightness values in the color gamut of the source device and the color gamut of the reference color space, as a minimum brightness value in the auxiliary brightness; and a cusp point setting unit setting the larger of cusp points in the color gamut of the source device and the color gamut of the reference color space, as a cusp point of the auxiliary gamut.

The gamut-conversion unit linearly may convert color in the color gamut of the source device into color of the set auxiliary gamut.

The gamut mapping may be carried out by using a compression or clipping mapping method.

According to another aspect of the present invention, there is provided a method of enhancing device-adaptive color, which includes setting a boundary of a device-adaptive auxiliary gamut using information on a color gamut of a source device creating original images and information on a color gamut of a desired reference color space; converting color in the gamut of the source device into color of the set auxiliary gamut; and carrying out a gamut mapping of the color of the auxiliary gamut to a destination gamut of an image output device.

BRIEF DESCRIPTION OF THE DRAWINGS

The above and other aspects of the present invention will be apparent from the following detailed description of exemplary embodiments taken in conjunction with the accompanying drawings, in which:

FIG. 3 is a view showing an example of a method of setting a boundary of the auxiliary color gamut, which is carried out by the auxiliary-gamut-setting unit shown in FIG. 2.

DETAILED DESCRIPTION OF EXEMPLARY EMBODIMENTS

Figure 1:
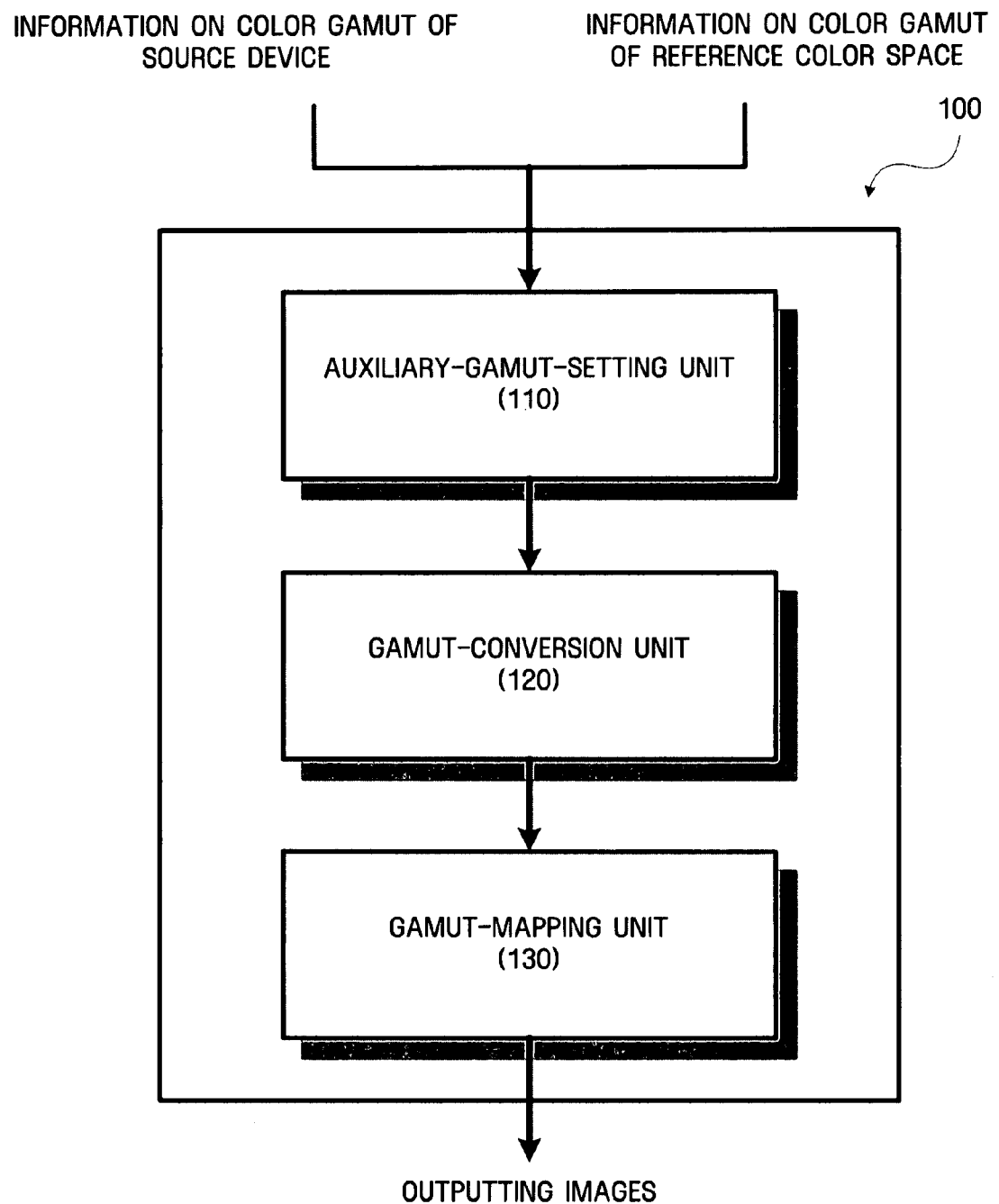
FIG. 1 is a block diagram illustrating the entire configuration of an apparatus for enhancing device-adaptive color according to an exemplary embodiment of the present invention.

Detailed particulars of additional exemplary embodiments are included in detailed descriptions and drawings. Advantages and features of the present invention, and ways to achieve them will be apparent from the exemplary embodiments of the present invention as will be described below together with the accompanying drawings. However, the scope of the present invention is not limited to such embodiments and the present invention may be realized in various forms. The embodiments to be described below are provided to bring the disclosure of the present invention to perfection and assist those skilled in the art to completely understand the present invention. The present invention is defined only by the scope of the appended claims. Also, the same reference numerals are used to designate the same elements throughout the specification.

Hereinafter, an apparatus and method for enhancing device-adaptive color according to the exemplary embodiments of the present invention will be described with reference to block diagrams and flowcharts in the accompanying drawings.

FIG. 1 is a block diagram illustrating the entire configuration of the apparatus for enhancing device-adaptive color according to an exemplary embodiment of the present invention. Referring to FIG. 1, the apparatus 100 for enhancing the device-adaptive color includes an auxiliary-gamut-setting unit 110, a gamut-conversion unit 120, and a gamut-mapping unit 130.

The auxiliary-gamut-setting unit 110 sets a boundary of the device-adaptive auxiliary gamut using information on the gamut of a source device creating original images and information on the gamut in a desired reference color space, in order to correct the brightness saturation, etc. of color of the original images. Here, the reference color space is not limited to a certain color space, but in this exemplary embodiment of the present invention, sRGB color space, will be described. This is because reference information regarding the gamut of a color is required in order to reflect gamut information of the source device when the images are output.

On the other hand, color gamut information refers to the maximum brightness value (white), the minimum brightness value (black) and a cusp point, which are included in the color gamut of the source device or the color gamut of the sRGB color space. Thus, it is possible to obtain information regarding the brightness and saturation of the color gamut from these values. Processes for comparing color gamut information of the source device with color gamut information of the sRGB color space, so as to set the auxiliary gamut, will be described in detail with reference to the configuration of the auxiliary-gamut-setting unit 110, which sets the boundary of the auxiliary gamut.

Figure 2:
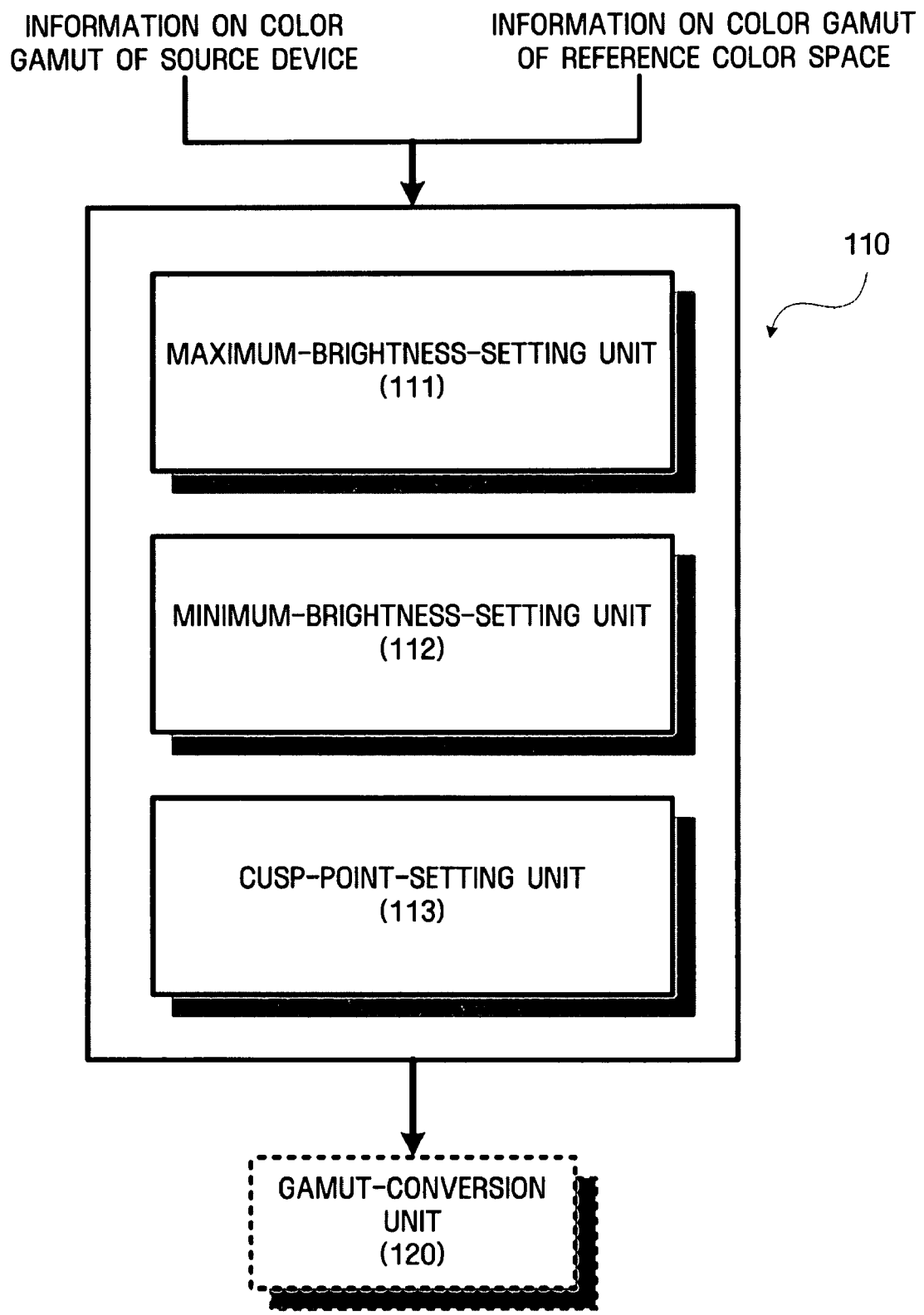
FIG. 2 is a block diagram illustrating a configuration of an auxiliary color gamut setting unit of the apparatus for enhancing the device-adaptive color according to an exemplary embodiment of the present invention shown in FIG. 1.

FIG. 2 is a block diagram illustrating the configuration of the auxiliary-gamut-setting unit 110, according to an exemplary embodiment of the present invention, and FIG. 3 is a view showing an example of a method of setting the boundary of the auxiliary gamut, which is carried out by the auxiliary setting unit 110, shown in FIG. 2.

Referring to FIG. 2, the auxiliary-gamut-setting unit 110 includes a maximum brightness value setting unit 111, a minimum brightness value setting unit 112, and a cusp point setting unit 113.

The maximum brightness value setting unit 111 plays a role of setting the maximum brightness in the boundary of the auxiliary gamut, and sets the larger of the maximum brightness values in the color gamut of the source device and the color gamut of the sRGB color space, as the maximum brightness value of the auxiliary gamut. Specifically, as shown in FIG. 3, it is determined which among the maximum brightness value $W_{source}$ in the color gamut of the source device and the maximum brightness value $W_{sRGB}$ in the color gamut of the sRGB color space is larger. In the case where the $W_{sRGB}$ is larger than the $W_{source}$, the maximum brightness value setting unit 111 sets the $W_{sRGB}$ as the maximum brightness value $W_{auxiliary}$ of the auxiliary gamut. To the contrary, if the maximum brightness value $W_{source}$ is larger than the maximum brightness value $W_{sRGB}$, then the maximum brightness value $W_{source}$ is set as the maximum brightness value $W_{auxiliary}$ of the auxiliary gamut.

The minimum brightness value setting unit 112 plays a role of setting the minimum brightness in the boundary of the auxiliary gamut, and sets the smaller of the minimum brightness values in the color gamut of the source device and the color gamut of the sRGB color space, as the minimum brightness value of the auxiliary gamut. Specifically, as shown in FIG. 3, the smaller value among the minimum brightness value $K_{source}$ in the color gamut of the source device and the minimum brightness value $K_{sRGB}$ in the color gamut of the sRGB color space is determined. In the case where the $K_{source}$ is smaller than the minimum brightness value $K_{sRGB}$, the minimum brightness setting unit 112 sets the minimum brightness value $K_{source}$ as the minimum brightness value $K_{auxiliary}$ of the auxiliary gamut. To the contrary, if the minimum brightness value $K_{sRGB}$ is smaller than the minimum brightness value $K_{source}$, then the minimum brightness value $K_{sRGB}$ is set as the minimum brightness value $K_{auxiliary}$ of the auxiliary gamut.

The cusp point setting unit 113 plays a role of setting a cusp point at which the saturation in the boundary of the auxiliary gamut becomes the maximum, and sets the larger of the cusp points in the color gamut of the source device and the color gamut of the sRGB color space, as the cusp point of the auxiliary gamut. The cusp point at which the saturation has the maximum value in the color gamut exists at a point in a coordinate plane showing the color gamut (the maximum saturation value Cc, the brightness value Lc at $C_{MAX}$).

Specifically, as shown in FIG. 3, it is determined which one of the maximum saturation value $C_{source}$ of the cusp values in the color gamut of the source device and the maximum saturation value $C_{sRGB}$ in the color gamut of the sRGB color space is larger. Then, if the maximum saturation value $C_{sRGB}$ is larger than the maximum saturation value $C_{source}$, the maximum saturation value $C_{sRGB}$ is set as the maximum saturation value $C_{auxiliary}$ of the auxiliary gamut. To the contrary, if the maximum saturation value $C_{source}$ is larger than the maximum saturation value $C_{sRGB}$, the maximum saturation value $C_{source}$ is set as the maximum saturation value $C_{auxiliary}$.

Further, it is determined which one of the brightness value $L_{source}$ of the cusp values in the color gamut of the source device and the maximum brightness value $L_{sRGB}$ in the color gamut of sRGB color space is larger. Then, if the cusp brightness value $L_{sRGB}$ is larger than the cusp brightness value $L_{source}$, the cusp brightness value $L_{sRGB}$ is set as a cusp brightness value $L_{auxiliary}$ of the auxiliary gamut. To the contrary, if the cusp brightness value $L_{source}$ is larger than the cusp brightness value $L_{sRGB}$, the cusp brightness value $L_{source}$ is set as a cusp brightness value $L_{auxiliary}$ of the auxiliary gamut.

Figure 4A:
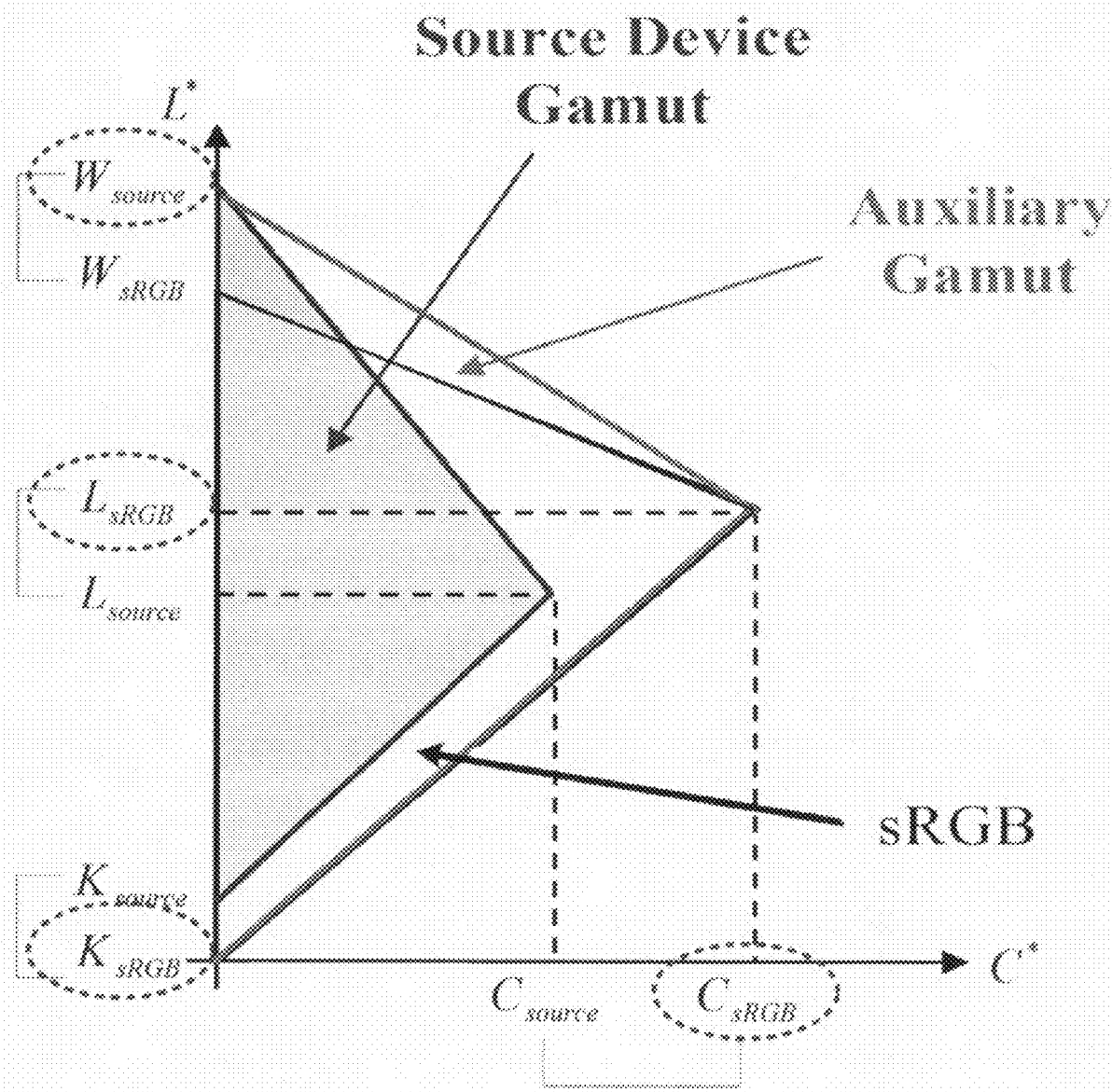
FIGS. 4A and 4B are graphs illustrating setting of the boundary of the auxiliary color gamut according to the method illustrated in FIG. 3.
Figure 4B:
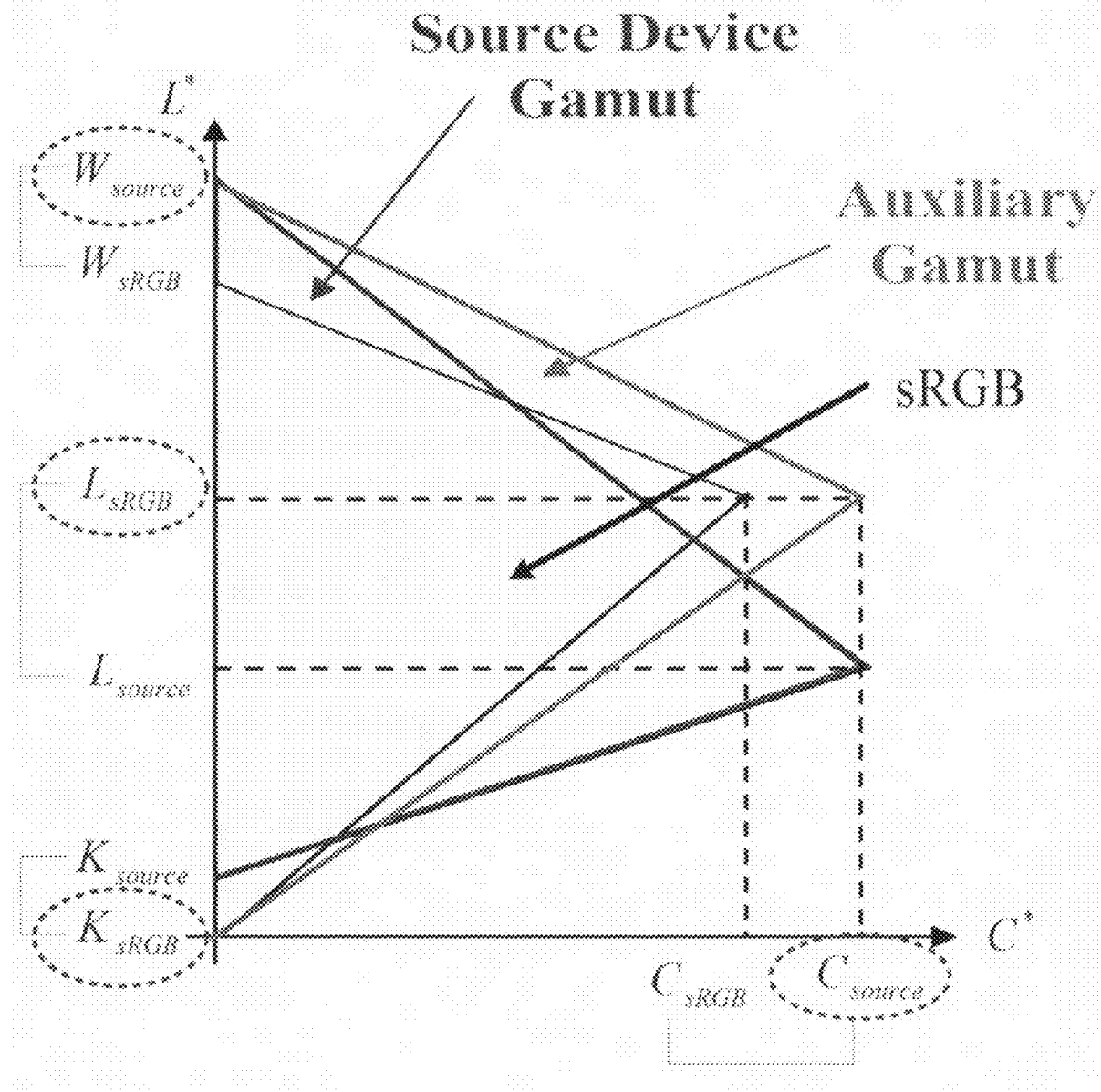

Heretofore, the method of setting the boundary of the device-adaptive auxiliary gamut has been described, and the graphs showing schematics of the method are provided as FIGS. 4A and 4B. FIGS. 4A and 4B are graphs illustrating the setting of the boundary of the auxiliary gamut according to the method illustrated in FIG. 3.

The ordinate axis of the graphs indicates brightness, showing the lightness of color, and is denoted by L*, while the abscissa axis indicates saturation, showing the definition of color, and is denoted by C*. The values of $W_{source}$ and $K_{source}$ shown on the ordinate axis refer to the maximum brightness value (white) and the minimum brightness value (black) of the color gamut of the source device, respectively. The values $C_{sRGB}$ and $C_{source}$ shown on the abscissa axis denote the maximum saturation value which is a cusp in the color gamut of the color space of the source device and the sRGB color space. Further, $L_{sRGB}$ and $L_{source}$ shown on the axis of ordinate indicate a cusp brightness value at the maximum saturation value.

Referring to FIG. 4A, with respect to the maximum brightness value $W_{auxiliary}$ among the boundary values of the auxiliary gamut, since the maximum brightness value $W_{source}$ of the color gamut of the source device has a larger value than the maximum brightness value $W_{sRGB}$ of the color gamut of the sRGB color space, maximum brightness value $W_{auxiliary}$ is equal to the maximum brightness value $W_{source}$. With regard to the minimum brightness value $K_{auxiliary}$ among the boundary values of the auxiliary gamut, since the minimum brightness value $K_{sRGB}$ of the color gamut of the sRGB color space has a smaller value than the minimum brightness value $K_{source}$, the minimum brightness value $K_{auxiliary}$ is equal to the minimum brightness value $K_{sRGB}$. Relating to the cusp points $C_{auxiliary}$ and $L_{auxiliary}$ among the boundary values of the auxiliary gamut, since the maximum saturation value $C_{sRGB}$ has a greater value than the maximum saturation value $C_{source}$, and the maximum cusp value $L_{sRGB}$ has a greater value than the maximum cusp value $L_{source}$, the values $C_{auxiliary}$ and $L_{auxiliary}$ are equal to the values $C_{sRGB}$ and $L_{sRGB}$, respectively.

Similarly, referring to FIG. 4B, with regard to the maximum brightness value $W_{auxiliary}$ among the boundary values of the auxiliary gamut, since the maximum brightness value $W_{source}$ of the color gamut of the source device has a greater value than the maximum brightness value $W_{sRGB}$ of the color gamut of the sRGB color space, the maximum brightness value $W_{auxiliary}$ is equal to the value of $W_{source}$. With respect to the minimum brightness value $K_{auxiliary}$ among the boundary values of the auxiliary gamut, since the minimum brightness value $K_{sRGB}$ of the color gamut in the sRGB color space has a smaller value than the minimum brightness value $K_{source}$ of the color gamut of the source device, the minimum brightness value $K_{auxiliary}$ is equal to the value of $K_{sRGB}$. Relating to the cusp points $C_{auxiliary}$ and $L_{auxiliary}$ among the boundary values of the auxiliary gamut, since the maximum saturation value $C_{source}$ has a greater value than the maximum saturation value $C_{sRGB}$ and the cusp brightness value $L_{sRGB}$ is a larger value than the cusp brightness value $L_{source}$, the values $C_{auxiliary}$ and $L_{auxiliary}$ are equal to the values of $C_{source}$ and $L_{sRGB}$, respectively.

After setting the auxiliary gamut, which reflects information on the color gamut of the source device, according to an exemplary embodiment of the present invention, the gamut-conversion unit 120 converts the color in the gamut of the source device into the set auxiliary gamut. The conversion is preferably carried out in a linear manner. A color gamut mapping adapted to a destination gamut of the output unit is required in order to effectively reproduce the image information of the source device, converted into the color of the auxiliary gamut, in the output device. The color gamut mapping is carried out by the gamut-mapping unit 130.

Specifically, the gamut-mapping unit 130 carries out gamut mapping wherein the color of the auxiliary gamut is mapped to the destination gamut of the image output device. Here, color gamut means a range of the color reproduction. The gamut mapping is a process of matching two different gamuts with each other because the range of the auxiliary gamut is different from the range of the gamut which the output unit can reproduce. General types of the gamut mapping are described below.

First, there is a cusp mapping method, which is used in cases where the difference of cusp positions between the source gamut and the destination gamut increases. The cusp mapping method carries out a mapping of the source data to the destination gamut in such a direction that the cusp of the source is reconciled with the destination cusp. Here, the word "cusp" refers to the maximum value of the saturation.

Second, there is a clipping mapping method, which is used in cases where the difference of cusp positions between the source gamut and the destination gamut is small. The clipping mapping method is carried out when the source gamut includes the entire destination gamut. This method carries out mapping of data in a region in which the source gamut is greater than the destination gamut, to the boundary of the destination gamut.

Third, there is an extension mapping method, which is used in cases where the difference between cusp positions of the source gamut and the destination gamut is small. This method is carried out when the destination gamut includes the entire source gamut. The extension mapping method carries out mapping of data of the source gamut, which is included in the destination gamut, to the destination gamut using a boundary ratio of the source gamut and the destination gamut.

Gamut mapping according to the exemplary embodiment of the present invention can be carried out by using a compression or clipping mapping method.

In the meantime, the word "unit" used in the exemplary embodiments of the present invention as shown in FIG. 1 refers to structural elements such as software, Field Programmable Gate Arrays or an Application Specific Integrated Circuits (ASIC), which carry out specified functions. However, the unit is not limited to those. The structural elements may be located in a storage medium to be addressed and may reproduce one or more processors. Thus, as an example, the structural elements may include such elements as software structural elements, object-oriented software structural elements, class structural elements, and task structural elements, processes, functions, properties, procedures, sub-routines, segments of a program code, drivers, firmware, microcode, circuits, data, databases, data structures, tables, arrays, and parameters, but are not limited to the above. Functions provided by the structural elements can be integrated by a small amount of structural elements, or separated into additional structural elements. Further, the structural elements are realized so as to reproduce one or more CPUs in the device.

Figure 5:
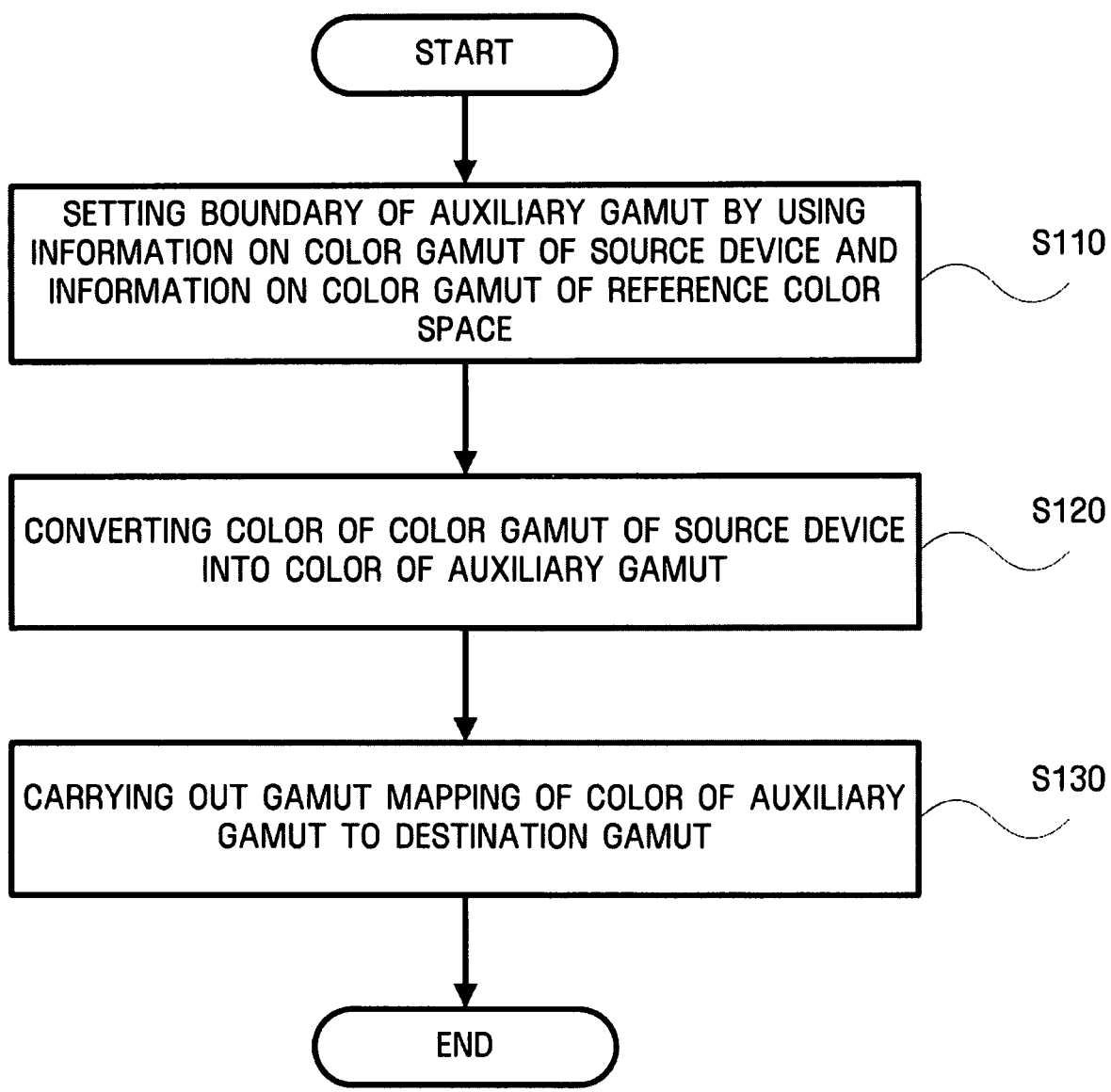
FIG. 5 is a flowchart illustrating the method of enhancing the device-adaptive color according to an exemplary embodiment of the present invention.

Hereinafter, all processes sequentially carried out according to the embodiment of the present invention will be described with reference to FIG. 5. FIG. 5 is a flowchart illustrating the method of enhancing the device-adaptive color according to an exemplary embodiment of the present invention.

First, in operation S110, the auxiliary-gamut-setting unit 110 sets the boundary of the device-adaptive auxiliary gamut using the information on the color gamut of the source device and the information on the color gamut of the desired reference color space S110. Here, the reference color space may include the sRGB color space. The process of operation S110 will be described as follows:

First, out of the maximum brightness values in the color gamut of the source device and the color gamut of the reference color space, the larger of the two is set as the maximum brightness value of the auxiliary gamut. Next, out of the minimum brightness values in the color gamut of the source device and the color gamut of the reference color space, the smaller of the two is set as the minimum brightness value of the auxiliary gamut. Then, out of the cusp points in the color gamut of the source device and the color gamut of the reference color space, the larger of the two is set as the cusp point of the auxiliary gamut.

Next, the color gamut-conversion unit 120 converts the color in the color gamut of the source device into the color of the set auxiliary gamut (S120). This conversion can be carried out in a linear manner.

Finally, the gamut-mapping unit 130 performs the gamut mapping of the color of the auxiliary gamut to the destination gamut of the image output device (S130). Here, the gamut mapping may be carried out by using a compression or clipping mapping method.

The above-mentioned exemplary embodiments of the present invention can be applied to hardcopy output devices, such as color laser printers, photo printers, inkjet printers, and multi-functional printers, etc., which can obtain and output optical gamut input images, softcopy output devices such as PDPs, LCDs, and mobile display devices, and storage or output devices for storing or outputting image processing software and images.

It should be obvious to persons skilled in the art that the scope of the apparatus for enhancing the device-adaptive color according to the present invention pertains to recording media which can read a computer having program codes recorded in order to carry out the above-mentioned method in the computer.

According to the exemplary embodiments of the present invention, it is possible to create a device-adaptive auxiliary gamut which reflects the information on the color gamut of the source device, and carry out gamut mapping, thereby enhancing the color reproduction of the input images.

The effects of the present invention are not limited to the above-mentioned effects, and other effects, which are not mentioned, will be understood by a person skilled in the art.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for enhancing device-adaptive color, the apparatus comprising:
   an auxiliary-gamut-setting circuit unit which sets a boundary of a device-adaptive auxiliary gamut using information on a color gamut of a source device and information on a color gamut of a desired reference color space;
   a gamut-conversion circuit unit which converts color in the gamut of the source device into color of the device-adaptive auxiliary gamut with the set boundary; and
   a gamut-mapping circuit unit which performs a gamut mapping of the color of the device adaptive auxiliary gamut to a destination gamut of an image output device.

2. The apparatus of claim 1, wherein the reference color space comprises a standard red, green and blue color space.

3. The apparatus of claim 1, wherein the information on the color gamut of the source device and the information on the color gamut of the desired reference color space comprises white as a maximum brightness value, black as a minimum brightness value, and a cusp point of the color gamut.

4. The apparatus of claim 3, wherein the auxiliary-gamut-setting unit comprises:
   a maximum brightness setting unit which sets a larger one of the maximum brightness values in the color gamut of the source device and the color gamut of the reference color space, as a maximum brightness value in the auxiliary gamut;
   a minimum brightness setting unit which sets a smaller one of the minimum brightness values in the color gamut of the source device and the color gamut of the reference color space, as a minimum brightness value in the auxiliary brightness; and
   a cusp point setting unit which sets a larger one of cusp points in the color gamut of the source device and the color gamut of the reference color space, as a cusp point of the auxiliary gamut.

5. The apparatus of claim 1, wherein the gamut-conversion circuit unit linearly converts color in the color gamut of the source device into color of the set auxiliary gamut.

6. The apparatus of claim 1, wherein the gamut mapping is carried out by using a compression or clipping mapping method.

7. A method of enhancing device-adaptive color, the method comprising:
   setting, by at least one hardware processor, a boundary of a device-adaptive auxiliary gamut using information on a color gamut of a source device and information on a color gamut of a desired reference color space;
   converting, by the at least one hardware processor, a color of the gamut of the source device into color of the device-adaptive auxiliary gamut with the set boundary; and
   gamut mapping, by the at least one hardware processor, of the color of the auxiliary gamut to a destination gamut of an image output device.

8. The method of claim 7, wherein the reference color space comprises a standard red, green and blue color space.

9. The method of claim 7, wherein the information on the color gamut of the source device and the information on the color gamut of the desired reference color space comprises white as a maximum brightness value, black as a minimum brightness value, and a cusp point of the color gamut.

10. The method of claim 9, wherein the setting the boundary of the auxiliary gamut comprises:
    setting a larger one of the maximum brightness values in the color gamut of the source device and the color gamut of the reference color space as a maximum brightness value in the auxiliary gamut;
    setting a smaller one of the minimum brightness values in the color gamut of the source device and the color gamut of the reference color space as a minimum brightness value in the auxiliary gamut; and
    setting a larger one of cusp points in the color gamut of the source device and the color gamut of the reference color space, as a cusp point of the auxiliary gamut.

11. The method of claim 7, wherein the converting the color of the gamut comprises linearly converting a color of the color gamut of the source device into color of the set auxiliary gamut.

12. The method of claim 7, wherein the gamut mapping is carried out by using a compression or clipping mapping method.

13. A non-transitory computer-readable storage medium encoded thereon a program code for carrying out a method of enhancing device adaptive color, the method comprising:
   setting a boundary of a device-adaptive auxiliary gamut using information on a color gamut of a source device and information on a color gamut of a desired reference color space;
   converting a color of the gamut of the source device into color of the device adaptive auxiliary gamut with the set boundary; and
   gamut mapping of the color of the device adaptive auxiliary gamut to a destination gamut of an image output device.

14. The "non-transitory" computer-readable storage medium of claim 13, wherein the reference color space comprises a standard red, green and blue color space.

15. The "non-transitory" computer-readable storage medium of claim 13, wherein the information on the color gamut of the source device and the information on the color gamut of the desired reference color space comprises white as a maximum brightness value, black as a minimum brightness value, and a cusp point of the color gamut.

16. The "non-transitory" computer-readable storage medium of claim 15, wherein, wherein the setting the boundary of the auxiliary gamut comprises:
   setting a larger one of the maximum brightness values in the color gamut of the source device and the color gamut of the reference color space as a maximum brightness value in the auxiliary gamut;
   setting a smaller one of the minimum brightness values in the color gamut of the source device and the color gamut of the reference color space as a minimum brightness value in the auxiliary gamut; and
   setting a larger one of cusp points in the color gamut of the source device and the color gamut of the reference color space, as a cusp point of the auxiliary gamut.

17. The "non-transitory" computer-readable storage medium of claim 13, wherein the converting the color of the gamut comprises linearly converting a color of the color gamut of the source device into color of the set auxiliary gamut.

18. The "non-transitory" computer-readable storage medium of claim 13, wherein the gamut mapping is carried out by using a compression or clipping mapping method.

* * * * *